Patented July 9, 1940

2,206,975

UNITED STATES PATENT OFFICE 2,206,975

POISON FOR COMBATING INSECTS

Walter E. Ripper, Hadersdorf-Weidlingau, Austria

No Drawing. Application November 16, 1937, Serial No. 174,824. In Austria November 20, 1936

6 Claims. (Cl. 167—14)

The present invention relates to an improved form of stomach poisons suitable for combating insects, animals, vermin, and the like, which poisons are particularly characterized by being provided with a substantially water-insoluble coating, this coating however being of such a character that it is digestible in the alimentary tract of the insect, animal, or other creature that may eat the poison, whereby the poison is liberated within the creature, causing its death.

One of the objects of the invention is to provide poisons, particularly such as are partially or wholly water-soluble or are capable of being deteriorated, destroyed or impaired under the influence of the atmosphere, as by rain, moisture, sunlight and the like, with a coating of an organic material which protects them against moisture or other deteriorating influences and keeps them from dissolving, but which substance by reason of its nature is capable of being digested by the insect or other creature which eats it. This coating material may consist of some form of cellulose or hemicellulose, which as is well known is capable of being digested by many insects, or may consist of a protein which is digestible by most creatures.

Among the objects of the invention are also the methods hereinbelow described for the preparation of a number of poisons, based upon the above principles.

Many effective poisons cannot be used in combating insects and vermin which destroy articles of value—for example, wood, either while in storage or in the form of buildings, or plants, plant or animal products—because the poison, while being fatal to the insect or animal which it is desired to destroy, is more or less water soluble. Thus, if the material is diluted with water or if the article that is to be protected becomes wet, after being treated, from rain, dew, or the like, considerable amounts of the poison will become dissolved and leach out, thus either leading to the removal of the protection which has been afforded or the solution of the poison gets into the goods themselves, which, in the case of plants, may prove fatal thereto.

Some of these difficulties have been overcome by converting the poisons into a less soluble form. For instance, in the case of arsenic preparations, insoluble calcium or lead salts of arsenic trioxide were prepared. Alternatively, plant-protective materials were added or admixed with the arsenic so as to combine with any free arsenic acid to protect the plants from attack. For example, the water-solubility of Paris green has been diminished by mixing it with a certain amount of lime. It however followed that if the water solubility of the poison was diminished, this also diminished the solubility of the poison within the alimentary tract of the insect or animal which it was desired to destroy, thus either inactivating the poison or at least greatly delaying its action. As a result, a considerable amount of the poison was eliminated by the insect or animal in nonassimilated form. This therefore made it necessary to use considerably larger quantities of the poison to insure that the insect or animal would ingest a sufficient quantity thereof to constitute a lethal dose of the poison.

In accordance with the present invention, these difficulties are solved by providing minute particles of a more or less water-soluble poison and coating these individual particles with a substance that is not water soluble, but will only be solubilized and hence removed by the digestive juices present in the alimentary tract of the insect or animal. It is possible thus to produce products in which the water-soluble portion is so small that the articles protected thereby, as for example plants, will not be harmed, while at the same time the wetting of the poisonous material will not leach therefrom its toxic constituents.

Thus, in accordance with the present invention there are produced much more effective stomach poisons, which may contain actually smaller quantities of poisonous material and which are therefore capable of being used with less danger, while an additional advantage resides in the fact that very specific poisons may be made, differentiating in their effect between the various insects and animals.

As already mentioned, there are a great many harmful insects and animals, other than those which attack living plants, and it is well known that wooden articles such as furniture, houses, posts, poles, and the like, are often destroyed by deleterious insects, for example by ants, termites, and the like, while material in stores, such as pelts, skins, hides, etc., are often destroyed or attacked by various types of vermin, either of the insect or animal types.

Stomach poisons, for combating such insects or animals, may be made in accordance with the present invention, based upon the above principles, the main essential feature being that the water-insoluble coating of the poisonous particles is digestible by the insects or animals. For example, a poisonous material coated with a thin film of cellulose or hemicellulose would constitute one embodiment of this invention. Inasmuch as most wood-destroying insects, such as termites, teredos, and the like, have cellulases in their alimentary juices, whereby they are capable of digesting cellulose and assimilating the same, it is very advantageous to provide a poison that is suitable in combating such creatures with a coating of cellulose or hemicellulose. Most insects are capable of digesting cellulose. It is of course obvious that by choosing a suitable water-insoluble but digestible material, poisons may be made which are selective to a definite type of insect.

In addition to cellulose and its related carbohydrate products there may also be employed coatings of various types of proteins, while the poisons themselves may be of either inorganic or organic nature. Most suitable have been found to be the water-insoluble prolamins or gliadins, which are soluble only in alcohol, zein being particularly suitable. There is one particular difference between those substances and all previously proposed coating materials, and that is the property possessed by zein of being very attractive to insects, who greedily devour this type of protein, as a result of which it has been found that poisons that have been coated with zein are consumed in much larger quantities than are poisons that are left without a coating or coated with some greasy material. The stomach poisons themselves may be either water soluble or partly water soluble or of a nature which is easily decomposed or deteriorated by contact with moisture or under the influence of light, and the invention is by no means to be limited to any particular poisonous substances, as the choice of substances obviously depends upon the type of living creature which it is desired to poison and destroy. Therefore the hereinbelow mentioned examples are to be taken purely as illustrative and in no sense are to be considered as limiting the invention.

EXAMPLE 1.—*Preparation of cellulose-coated arsenic oxide.*—5 grams of cellulose are dissolved in 100 grams of cuprammonium solution, to which there are then added 60 grams of ammonia solution. In a separate vessel 30 grams of very finely ground $As_2O_3$ are mixed with 400 grams of water to form a suspension, which latter is then poured into the cuprammonium-cellulose solution. In a short time after the addition there will become deposited on the surface of the $As_2O_3$ particles a fine coating of regenerated cellulose. When this has taken place the water is removed by filtration or otherwise, thus forming the finished product, which is then dried. Arsenic trioxide particles protected with a cellulosic film possess a water solubility of less than 3.5% as contrasted with an arsenic trioxide content of about 26%.

The invention also contemplates the protection of an oil-soluble toxic substance by means of a film which is insoluble in oil as well as in water, whereby it becomes possible to disperse the oil-soluble poison thus coated in an emulsion containing oil and water or in an organic fluid which would ordinarily tend to dissolve the poisonous substance itself, so that it becomes possible to produce a suspension of a potentially soluble poison in a fluid which is normally a solvent thereof but which is protected against solution by an intervening film of insoluble material. Among the coating materials which may be used for such a purpose are, for example, cellulose and various types of proteins. Water-insoluble coatings may comprise cellulose, regenerated cellulose, proteins which are naturally insoluble in water but which require solvents as for example casein, vegetable proteins, etc., or proteins which ordinarily are water soluble but which after being applied to the particles are rendered insoluble in situ by various reagents or by means of heat. In the case of albumin and similar proteins, heat to coagulate the same may be employed, or they may be subjected to treatment with tanning agents or other insolubilizing agents such as formaldehyde or similarly acting aldehydes. The exact method of applying the coating depends upon the nature of the material being treated and is open to a comparatively wide choice. The particles so treated may be used by themselves or may be used in admixture with or incorporated in any suitable bait which will attract insects or other animals and impel them to eat the material, including the poison.

Another advantage of the present invention lies in the fact that many insects, such for example as the Japanese beetle, are sufficiently intelligent to notice poisons when they are put into their path, so that they will not eat the poison. By the present invention, however, it is possible so to coat the poison that the insects are no longer able to detect it as such, and hence will eat it unaware of the nature of the material, so that effective poisoning of these and similar insects thus becomes possible. The economic advantages of such a procedure will at once be apparent to entomologists.

An alternative method of coating the particles may consist, for example, of suspending the poisonous material in a dispersing medium containing the coating material, whereupon the mixture is atomized or sprayed so as to remove the solvent or other dispersing medium, thus leaving a coating of the desired water-insoluble material upon the particles of the toxic substance.

As further examples of the present invention the following may be cited:

EXAMPLE 2.—*Preparation of protein-coated cyanide.*—A suspension of about 30 grams of potassium cyanide or calcium cyanide in 99% of alcohol is prepared. On the other hand, there is prepared a 5% to 10% solution of vegetable proteins, such for example as zein or gliadin, in alcohol of high concentrations, for instance a 5% or 10% solution of zein in 99% of alcohol. These two separate solutions are allowed to become admixed in the nozzle of an atomizing device, from which they are atomized into an inert gas, such as nitrogen, at a pressure of about 15 atmospheres. As a result of this treatment there will form about each individual tiny particle of the cyanide a thin film of the protein-containing alcohol solution. When spraying this mixture into nitrogen at about 60° C. or at ordinary atmospheric temperature, the alcohol will evaporate during the descent of the particles to the floor of the spray chamber or tower, as a result of which a very fine film of protein will be deposited about the cyanide particles.

EXAMPLE 3.—*Preparation of protein-coated arsenic oxide.*—Arsenic oxide may be coated with proteins in similar manner to that described in Example 2.

EXAMPLE 4.—*Preparation of protein-coated cyanide.*—Potassium cyanide particles are suspended in an alcoholic solution of vegetable proteins, which however, in addition to the vegetable protein, also contain about 30% of alcohol-insoluble albumin in the form of a suspension. For this purpose alcohol-insoluble vegetable proteins may be used. Upon spraying and evaporating the alcohol, as in connection with Example 2, the potassium cyanide will be surrounded by a film of protein, which in this case is somewhat thicker than that produced in accordance with Example 2.

EXAMPLE 5.—*Casein-coated rotenone.*—A drug containing rotenone is finely ground and is then introduced into a suspension of 20% casein and 3% of soap solution, the resulting mixture being atomized into air at 90° C. The resulting dry dust is then hardened by means of 40% of formaldehyde or similar aldehyde capable of converting the casein into an insoluble substance.

EXAMPLE 6.—*Casein-coated arsenic oxide.*—By operating in accordance with the method shown in Example 5 but substituting $As_2O_3$ for the rotenone, a casein-coated arsenic oxide may be obtained.

EXAMPLE 7.—*Protein-coated arsenic preparation employing gliadin.*—Wheat starch was extracted by means of a 70% alcohol solution—that is to say, a liquid containing 70% of alcohol and 30% of water,—so as to yield an extract containing about 7% of total solids extracted from the wheat starch, representing the therein contained vegeable protein known as gliadin. The extract thus obtained was employed to form a suspension of 70 grams of a mixture of arsenic and kaolin, which latter had been prepared as follows: Into 1000 grams of a concentrated aqueous solution of $As_2O_3$ 40 grams of kaolin were introduced, whereupon the mixture was evaporated to dryness and then finely ground. 70 grams of the said arsenic-kaolin mixture were introduced into the above mentioned solution of gliadin, whereupon the resulting suspension was atomized into a spray chamber at 35° C., resulting in the formation of a dry powder in which each arsenical particle was coated with a microscopical layer of gliadin. The finished product was found to contain about 1.87% of water-soluble arsenic oxide (calculated as $As_2O_5$) while a test made on the uncoated arsenic-kaolin mixture showed a content of about 29.66% water-soluble arsenic oxide (similarly calculated). A number of tests were made in order to determine the optimum amount of protein to be used, and the results obtained are given in the following table:

Table 1

| Total solids in 70% alcohol solution, substantially gliadin in percent | Suspended arsenic-kaolin mixture used per 100 cc. of extract in grams | Total arsenic compound of finished product in percent $As_2O_5$ | Water-soluble part in percent $As_2O_5$ |
|---|---|---|---|
| 0 | 0 | 31.68 | 10.20 |
| 7 | 70 | 21.0 | 1.87 |
| 5 | 500 | 27.46 | 3.44 |
| 0.75 | 150 | 24.20 | 2.60 |
| 0 | 0 | 65.15 | 29.66 |
| 4.2 | 210 | 51.47 | 5.27 |

In the first four items of Table 1, an atomizing gun, very much of the same nature as those employed for spray painting, was used, at pressures between ¾ and 5 atmospheres, while in the last two items of the table a rotating dispersing disk was employed, making 7500 revolutions per minute, the temperature in the drying chamber being 65° C. The products obtained by the above method shows a much higher poison factor than the ordinary calcium arsenates usually employed against caterpillars and bugs.

EXAMPLE 8.—*Zein-coated arsenic preparation.*—Instead of employing gliadin from wheat starch as mentioned in Example 7, there was employed a solution of albumin of corn, which is known as zein. This was dissolved in concentrated alcohol, the method of preparation being substantially identical with that in Example 7. In Table 2 hereinbelow there is shown the effect of the various amounts of alcohol employed and the nature of the resulting products.

*Table 2*

| Alcohol in extracting medium, in percent | Total solids, substantially zein, in percent | Total solids of extract defatted | Total arsenic content of finished product in percent $As_2O_5$ | Water-soluble content in $As_2O_5$ in percent |
|---|---|---|---|---|
| 0 | 0 | No | 31.68 | 10.20 |
| 70 | 1.7 | No | 18.05 | 1.77 |
| 96 | 0.65 | Yes | 19.05 | 2.79 |
| 0 | 0 | No | 65.15 | 29.66 |
| 70 | 2.6 | No | 55.58 | 1.35 |

The products coated with zein are also more poisonous than calcium arsenate. Operating in a manner quite analogous to that described in connection with $As_2O_3$, it was found possible to surround sodium arsenite and potassium cyanide with zein. The water solubility of zein-coated sodium arsenite was diminished from 80.04%, calculated as $As_2O_5$, in the case of the uncoated material, to as little as 5.58% of soluble arsenic, calculated as $As_2O_5$, in the case of zein-coated sodium arsenite.

EXAMPLE 9.—*Arsenic-kaolin-zein preparation.*—A mixture of arsenic and kaolin prepared as in Example 7 was mixed with a suspension of 1.7% of zein in 96% of alcohol, using for this purpose 1000 grams of the zein solution to 17 grams of the arsenic-kaolin mixture, whereupon the alcohol was merely evaporated. The resultant product was then completely dried, whereupon it fell into a very fine powder in which the individual poison-containing particles were coated with a film of vegetable protein, namely, the zein. The water-soluble $As_2O_5$ content of the resulting material was found to be 1.81%, while in contrast thereto the water-soluble content of the arsenic-kaolin mixture was about 10.24% of $As_2O_5$. It should be mentioned that gliadin may be substituted for the zein in these operations, although in the latter case it is necessary to grind the resulting product after the evaporation of the alcohol, but in that case the water solubility of the arsenical portion of the material is somewhat greater, namely, 6.52% $As_2O_5$. The greater part of the water-soluble $As_2O_5$ could be washed out of the material eventually yielding a product which contained only 2.56% of water-soluble $As_2O_5$.

EXAMPLE 10.—*Zein coated calcium cyanide preparation.*—A 5% solution of vegetable protein, such as zein, in 99% of alcohol is prepared; to this solution I mix 50 grams of calcium cyanide per each 100 cc. of the solution before starting the atomizing operation. The suspension thus formed is then atomized into a vacuum container.

In preparing the said vacuum container for use in the process according to the invention air is being removed therefrom and is replaced by an inert gas, such as nitrogen, which at the beginning of the atomizing is present at a pressure of about 5 inches. The atomizing is performed by means of a painting gun specially adapted to the purpose in question, compressed nitrogen being used instead of compressed air for atomizing the liquid. The gas introduced by the atomizing process into the container is continuously sucked off by a vacuum pump maintaining the pressure of 5 inches, a filtering device arranged in the suction pipe prevents the dried particles from being sucked off with the gas. The evaporation of the alcohol is preferably promoted by raising the temperature to about 50° C. by means of any known heating device, such as a steam jacket or the like.

A dry powder results in which the particles are coated by a thin layer of zein.

It will be apparent from what has been said hereinabove that the invention may be carried out in quite a number of different ways, provided only that there is produced upon minute particles of a toxic material a coating of some substance which will protect the said material, but which coating is digestible by the animal or insect which it is desired to poison. The invention is to be sharply differentiated from such proposals as contemplate the use of pills or other relatively large bodies of poisonous material, and also is to be differentiated from those proposals in which a poisonous substance, as for example Paris green, is mixed with a relatively large amount of a fatty material so as to become incorporated therein and thoroughly impregnated therewith for the purpose of producing a preparation which is floating on the surface of water when used for combating mosquito larvae in ponds and stagnant water. In accordance with the present invention there is no impregnation of the poisonous material but merely a very thin coating thereof, and the particles themselves are extremely small, the upper limit of their diameter being $\frac{1}{10}$ mm., much smaller particles being however used in most cases.

Another important consideration which differentiates the present invention from some of the prior art is that the coating itself is in all cases nontoxic. It has already been proposed to protect arsenicals by coating them with metal soaps to prevent their ready solubility in rain water, so that they cannot be washed off plants when sprayed or enter into the plant structure to the latter's detriment. In such cases however the coating itself, while water insoluble, was also toxic and also had a taste or odor which would repel the insects so that they would decline to eat the offered poison; furthermore it is not digestible in the digestive juices of the alimentary tract of the insects or animals to be destroyed. In the present invention the coating must be such as to be water insoluble, nontoxic and nonrepellent to the insects or animals who are to be induced to eat the poison coated therewith and digestible in the digestive juices of the alimentary tract of said insects or animals and this thought is entirely new. Attempts have been made in the past to coat various types of poisons with attractive materials, such for example as sugars, but these are water soluble and would not protect the poisonous substances themselves.

While several particular embodiments of this invention are shown above, it will be understood, of course, that the invention is not to be limited thereto since many modifications may be made, and it is contemplated, therefore, to cover any such modifications as fall within the true spirit and scope of this invention as defined by the appended claims.

I claim:

1. Stomach poison for combating insects and animals comprising minute individual particles of a toxic substance provided with a substantially water-insoluble edible organic coating nonrepellent to the insect or animal and soluble in the digestive juices of the alimentary tract of the insect or animal, and selected from the group consisting of celluloses, hemicelluloses and naturally water-insoluble proteins.

2. The product of claim 1 in which the coating is a prolamine.

3. The product of claim 1 in which the coating is zein.

4. The product of claim 1 in which the coating is gliadin.

5. The product of claim 1 in which the toxic substance is a cyanide and the coating is a prolamine.

6. The product of claim 1 in which the toxic substance is a form of arsenic and the coating is cellulose.

WALTER E. RIPPER.